United States Patent
Acar et al.

(10) Patent No.: US 8,683,393 B2
(45) Date of Patent: *Mar. 25, 2014

(54) INTEGRATED DESIGN ENVIRONMENT FOR NANOPHOTONICS

(75) Inventors: Emrah Acar, Montvale, NJ (US); Michael P. Beakes, Yorktown Heights, NY (US); William M. Green, Astoria, NY (US); Jonathan E. Proesel, Yorktown Heights, NY (US); Alexander V. Rylyakov, Mount Kisco, NY (US); Yurii A. Vlasov, Katonah, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/544,134

(22) Filed: Jul. 9, 2012

(65) Prior Publication Data
US 2014/0007032 A1    Jan. 2, 2014

Related U.S. Application Data

(63) Continuation of application No. 13/536,163, filed on Jun. 28, 2012.

(51) Int. Cl.
*G06F 17/50* (2006.01)
(52) U.S. Cl.
USPC .............. 716/52; 716/30; 716/51; 716/53; 716/55; 716/139; 385/14; 385/15
(58) Field of Classification Search
USPC ............... 716/30, 50–56, 139; 385/14, 15
See application file for complete search history.

(56) References Cited

U.S. PATENT DOCUMENTS

| 7,000,207 B2* | 2/2006 | Gothoskar et al. ............ 716/51 |
| 7,259,031 B1 | 8/2007 | Dickinson et al. |
| 8,116,624 B1 | 2/2012 | Wach |
| 2006/0158230 A1 | 7/2006 | Rahman |
| 2011/0250706 A1 | 10/2011 | Huff |
| 2011/0304994 A1 | 12/2011 | Mair |

FOREIGN PATENT DOCUMENTS

| FR | 2922031 A1 | 4/2009 |
| WO | WO2004015471 A2 | 2/2004 |

OTHER PUBLICATIONS

"DW 2000 Physical Layout and Verification Software", Design Workshop Technologies, @2009.*
("Scaling CMOS photonics transceivers beyong 100 Gb/s", by Mekis et al, @ Feb. 2012.*
Photonic Device Layout Within the Foundry CMOS Design Environment, by Jason S. Orcutt and Rajeev J. Ram, @2010.*
"VANDAL: A Tool for the Design Specification of Nanophotonic Networks", by Gilbert Hendry, Johnnie Chan, Luca P. Carloniz and Keren Bergman, @2011.*

(Continued)

*Primary Examiner* — Nha Nguyen
(74) *Attorney, Agent, or Firm* — Tutunjian & Bitetto, P.C.; Preston J. Young (57) ABSTRACT

Systems for integrated electronic and photonic design include a graphical user interface (GUI) configured to lay out electronic and photonic design components in a design environment; a design rule checking (DRC) module configured to check design rules for electronic and photonic components according to manufacturing requirements; and a processor configured to adjust photonic components according to photonic design requirements and to reconcile conflicts between electronic and photonic components.

19 Claims, 4 Drawing Sheets

(56) References Cited

OTHER PUBLICATIONS

Europractice "Europractice Photonics Design Information" Downloaded May 24, 2012 and available at http://wwww.europractice-ic.com/SiPhotonics_design_info.php. (1 page).

IMEC "Heterogeneous Integration Silicon Nanophotonics" Downloaded Jun. 25, 2012 and available at http://www2.imec.be/be_en/research/eterogeneous-integration/siliconnanophotonics.html. (1 page).

IPKISS "Welcome to the IPKISS Project" Downloaded on May 24, 2012 and available at http://www.ipkiss.be/web/. (5 pages).

Luxtera "Silicon Photonics Connectivity Solutions" Downloaded Jun. 25, 2012 and available at http://www.luxtera.com/. (2 pages).

Wang, B., et al. "Bottom-Up Verification Methodology for CMOS Photonic Linear Heterogeneous System" Proceedings of the Forum on Specification & Design Languages, FDL. Sep. 2010. (6 Pages).

* cited by examiner

INTEGRATED DESIGN ENVIRONMENT FOR NANOPHOTONICS

RELATED APPLICATION INFORMATION

This application is a Continuation application of copending U.S. patent application Ser. No. 13/536,163 filed on Jun. 28, 2012, incorporated herein by reference in its entirety.

BACKGROUND

1. Technical Field

The present invention relates to integrated electronic and photonic design methodologies and, more particularly, to design environments that incorporate both electronic and photonic elements.

2. Description of the Related Art

Designers of electronic devices and components frequently employ design tools to aid them. Such computer-aided design (CAD) makes use of automated rule checking and stock component types to allow a designer to rapidly create full circuit designs that conform to the requirements of the fabrication technology to be used.

While electronic design is well established, nanophotonic integrated circuits are an emerging domain and present design technologies are inadequate. At present, integrated electronic/photonic devices undergo two wholly separate design processes, one in the electronic domain and one in the photonic domain, and designers must iterate back and forth to resolve conflicts and malfunctions. Such methodologies, where two separate designs are merged, are highly error-prone and time-consuming Furthermore, photonic design tools are immature and lack the flexibility of electronic design tools.

For example, a designer may use a layout editor environment and check electrical properties, manufacturability, and design rules using a design rule checker (DRC) that is customized for a particular manufacturing setup solely targeting electrical performance. The designer may also perform such a step for the photonic design, having its own DRC process for photonics manufacturing processes and design rules, but photonic components have needs which don't have counterparts in the electrical domain.

SUMMARY

A method for integrated electronic and photonic design includes laying out electronic and photonic design components in a design environment; adjusting photonic components according to photonic design requirements using a processor; checking design rules for electronic and photonic components according to manufacturing requirements; and adjusting component positioning and size to reconcile conflicts between electronic and photonic components.

A method for integrated electronic and photonic design includes laying out electronic and photonic design components in a design environment, where photonic components are marked with a graphical element to distinguish photonic elements from electronic elements; adjusting parameters and shapes of photonic components according to photonic design requirements using a processor, including converting rectilinear design elements to curvilinear photonic design elements; checking design rules for electronic and photonic components by validating every component according to a set of design rules that reflect manufacturing requirements; and adjusting component positioning and size to reconcile conflicts between electronic and photonic components.

A method for integrated electronic and photonic design includes laying out electronic and photonic design components in a design environment, where photonic components are marked with a graphical element to distinguish photonic elements from electronic elements; adjusting parameters and shapes of photonic components according to photonic design requirements using a processor, including converting rectilinear design elements to curvilinear photonic design elements by replacing each corner in a piecewise linear photonic waveguide element with a corresponding radially bended curve; checking design rules for electronic and photonic components by validating every component according to a unified set of electronic and photonic design rules that reflect manufacturing requirements; and adjusting component positioning and size to reconcile conflicts between electronic and photonic components, river routing optical connections between components to maintain optical connectivity.

A system for integrated electronic and photonic design includes a graphical user interface (GUI) configured to lay out electronic and photonic design components in a design environment; a design rule checking (DRC) module configured to check design rules for electronic and photonic components according to manufacturing requirements; and a processor configured to adjust photonic components according to photonic design requirements and to reconcile conflicts between electronic and photonic components.

A system for integrated electronic and photonic design includes a graphical user interface (GUI) configured to lay out electronic and photonic design components in a design environment and to mark photonic elements with a graphical element to distinguish photonic elements from electronic elements; a design rule checking (DRC) module configured to check design rules for electronic and photonic components by validating every component according to a set of design rules that reflect manufacturing requirements; and a processor configured to adjust adjusting parameters and shapes of photonic components according to photonic design requirements, including converting rectilinear design elements to curvilinear photonic design elements, and to adjust component positioning and size to reconcile conflicts between electronic and photonic components.

A system for integrated electronic and photonic design includes a graphical user interface (GUI) configured to lay out electronic and photonic design components in a design environment and to mark photonic elements with a graphical element to distinguish photonic elements from electronic elements; a design rule checking (DRC) module configured to check design rules for electronic and photonic components by validating every component according to a unified set of electronic and photonic design rules that reflect manufacturing requirements; and a processor configured to adjust adjusting parameters and shapes of photonic components according to photonic design requirements, including converting rectilinear design elements to curvilinear photonic design elements by replacing each corner in a piecewise linear photonic waveguide element with a corresponding radially bended curve, and to adjust component positioning and size to reconcile conflicts between electronic and photonic components, river routing optical connections between components to maintain optical connectivity.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a unified design environment for electronic and photonic computer-aided design (CAD). Whereas previous attempts at integrated products were after-the-fact combinations of discrete electronic and photonic units, the present principles provide for the creation of integrated electronic/photonic circuits formed on a single substrate, thereby providing significant cost and performance benefits.

By integrating the design processes, the design environment can perform rule checking across both domains simultaneously, eliminating the tedious iterative reconciliation of two separate designs. In a typical design process, whether electronic of photonic, special layers and shapes are placed in a geometric space allocated to mask production that is used in integrated circuit manufacturing. The parameters for the layers and the shapes, including, e.g., length and width, have special-purpose meanings. For example, an RX layer is reserved for active transistor channels which make up the core of an n-type field effect transistor (NFET). It should be recognized that RX layer is used herein to refer to an electrical transistor diffusion layer. Although it is specifically contemplated that the RX layer is used, any suitable silicon mesa, on which a transistor or silicon photonic waveguide is fabricated, may be employed. For example, shallow trench isolation may be used to establish such a region. Any shape drawn on the RX layer will be printed onto an RX mask to be used within the manufacturing process.

Electrical designs use RX shapes to form devices, typically at pre-determined lengths based on the manufacturing process being used. For example, 32 nm technologies stipulate that RX has a minimum length of 32 nm. Photonic designs use RX shapes to transfer light signals in the form of waveguides. In the photonic regime there is a much different length/width restriction for RX shapes. When extending the designs into multiple domains, the present principles use markers to indicate relevant design verification and checker tools to specify areas of importance and specialization. As a result, embodiments according to the present principles can use markers on, e.g., a waveguide RX shape, to indicate that it is a photonic design component.

The present principles therefore provide the ability to differentiate between electronic and photonic RX shapes in a given design and to apply DRC rules specifically relevant to each. For example, RX shapes may be checked to ensure a minimum of 32 nm length in a given technology, but RX shapes indicated with a special "photonic" marker shape could be excluded from this check. Instead, such shapes would be checked against a photonics design rule, if any. In this way, embodiments according to the present principles can embody both electrical and photonics design layers and shapes with specialized marker layers to guide downstream design and verification tools.

Figure 1:
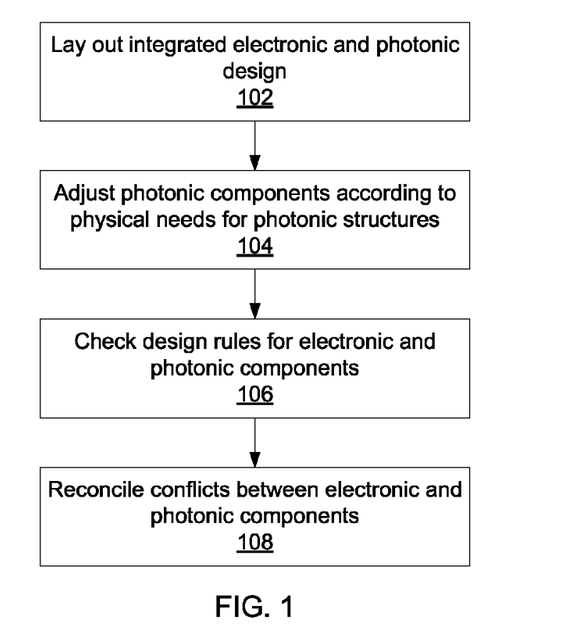
FIG. 1 is a block/flow diagram of an integrated electronic/photonic design method according to the present principles.

Referring now to the drawings in which like numerals represent the same or similar elements and initially to FIG. 1, a process for integrated electronic and photonic design is shown. Block 102 uses a CAD system to create a circuit layout that includes electronic and photonic components. The design components include a distinguishing flag that allows the system to differentiate between components that will have electronic design rules applied to them, and those that will have photonic design rules applied. This may be represented as a simple bit in memory that represents the component type, and may be visually represented in a graphical user interface to permit a designer to discern the component type at a glance.

Block 104 adjusts photonic components according to the physical needs that photonic structure have. Photonic structures operate in a very different way from electronic structures and hence have specific needs. For example, whereas a transmission line in an electronic circuit may be created with hard right angles, such a structure may not be used for a photonic waveguide—the hard angle would lead to transmission losses and may even disrupt transmission entirely. Instead, photonic waveguides use more gentle curves to preserve total internal reflection. Block 104 allows a designer to layout photonic structures in an intuitive way before automatically converting them to more physically practical shapes.

Furthermore, when a designer lays out a photonics component, block 104 may employ a blockage layer to generate key marker layers and shapes. For example, a metal exclusion layer may be included over a photonic component to prevent downstream verification errors from adding such a metal layer or objecting to the absence of a metal layer. Blockage layer generation takes each shape in a seed layer, creates a new shape that overlaps the shapes in the seed layer, and creates a blockage layer using the overlapping shape.

Block 106 performs DRC on the layout. Electronic and photonic components will have respective sets of rules that derive from their respective fabrication technologies. Rules such as minimum spacing, minimum feature size, and minimum turn radius will be checked across all components. In once embodiment, the photonic and electronic components are considered with separate sets of rules. In an alternative embodiment, a unified ruleset is created that accommodates all components by, e.g., selecting the stricter rule from each of the electronic and photonic rulesets. For example, in a case where the minimum feature size for electronic components is larger than the minimum feature size for photonic components, the larger minimum feature size will be used in the unified ruleset. In either case, the rules may be entered manually to accommodate specific design and manufacturing considerations, or may be automatically entered using, e.g., a spreadsheet.

If there are conflicts between components, block 108 reconciles those conflicts. Block 108 may accomplish this by notifying the designer of conflicts or by automatically adjusting the design to fit everything. Alternatively, block 108 may make an automatic attempt before notifying the user of any conflicts that are not accounted for. For example, block 108 may resize or move electronic and photonic components to resolve a conflict, performing river routing and DRC as necessary to ensure functional consistency and design rule acceptability.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A design environment according to the present principles may include a variety of features to assist in integrated electronic and photonic CAD. Such features may include, for example, a shape library toolkit that generates commonly used photonic structures with parameters and guidance from the designer. The shape toolkit may include a variety of shapes such as, e.g., different waveguide structures, couplers, modulators, etc. The shapes stored in the toolkit may be rectilinear and have a pre-defined resolution, or may be more flexibly shaped and controlled by the designer. For example, the shape toolkit may include S-bend and Mach-Zehnder interferometer shapes are typical shapes used in photonics designs.

Such a photonic shape library is distinct from, e.g., a library of parameterized cells (p-cells). Existing p-cell libraries fail to provide particular layout shapes for photonics design. A photonics shape library, such as the shape toolkit described above, is a design tool which permits the additional low-level, base functionality needed for a designer to construct a photonic p-cell. It is possible to create such a photonic p-cell by repeated function calls to elements of the shape library, for example by programming and executing a script.

Figure 2:
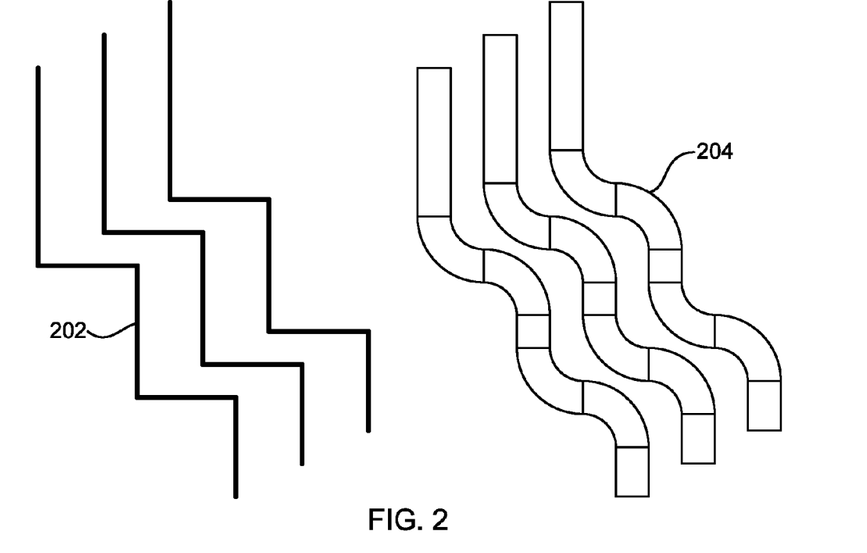
FIG. 2 is a diagram of automatic generation of radially bended curves from rectilinear paths according to the present principles.

Referring now to FIG. 2, a comparison of design elements representing electronic and photonic transmission paths. As noted above, while it is easy to draw and design using rectilinear structures, such as lines 202, as is possible in the electronic domain, such structures are not adequate for photonic designs. As such, the present principles allow the use of a radial bended path maker. The radial bended path maker is a tool which transforms rectilinear paths 202 into photonics-specific radially bended form 204. This allows the designer to work on a high level without providing detailed design information for every waveguide connection.

Figure 3:
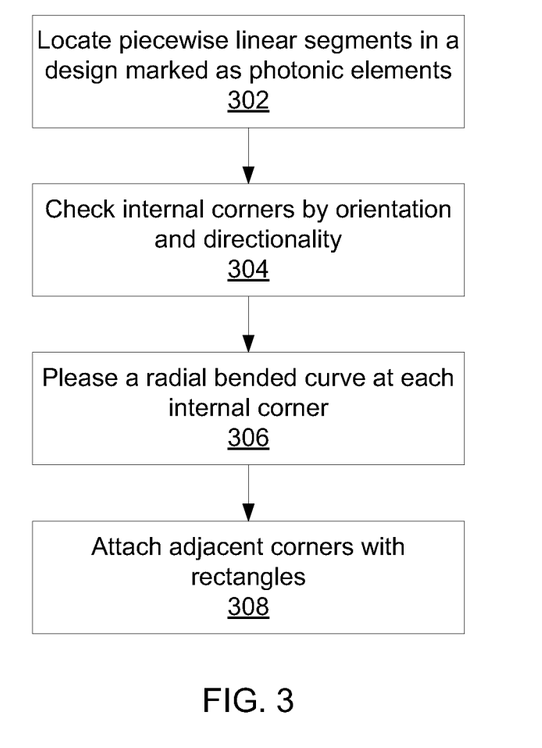
FIG. 3 is a block/flow diagram of a method for generating radially bended curves from rectilinear paths according to the present principles.

Referring now to FIG. 3, a method of creating radial bended paths 204 is shown. Block 302 accesses a design document that incorporates electronic and photonic elements and finds piecewise linear segments. These structures, such as the rectilinear paths 202 shown in FIG. 2, may be marked as being photonic structures, allowing for quick differentiation between those structures which are to become bent waveguides and those which may remain as rectilinear electronic paths.

Having located candidates for bending, block 304 builds a list of internal corners of the rectilinear path 202. Block 304 associates each internal corner with an orientation and directionality. There are eight exemplary possibilities for such corners: north-east, south-west, north-west, south-east, east-north, east-south, west south, and west-north. These eight possibilities represent the eight rectilinear paths that can be taken from one point to another. In particular it should be recognized that there may be multiple possible paths to each point. For example, the path may go "north" and then "east," or may instead go "east" and then "north." This distinction is relevant because one bend may be better able to fit in a given design layout and that directionality should be preserved.

For each such corner, block 306 places a radially bended curve over the corner. It is important to note that, in many manufacturing processes, the bends may still be fundamentally rectilinear due to limitations in existing electronic manufacturing design rules. It is conventional for design rules to require that all vertices in a layout meet at right angles. However, coarse 90 degree corners are not usable in photonic bends, which use smooth arcs to promote total internal reflection. To address this, the present process allows for automatic generation of high-resolution bended shapes that approximate appropriate curves. By implementing the curve at the highest available software design resolution (e.g., 1 nm), the present principles keep the "pixilation" of the curve below the resolution of the manufacturing process. When the design is manufactured, the relatively coarse operation of the manufacturing technology smoothes out the rectilinear pixilation, creating a consistent curve suitable for a photonic waveguide. Block 308 then attaches adjacent corners with padded rectangle shapes, representing the width of the straight portion of the bent waveguide 204.

Replacing rectilinear paths 202 with radially bent paths 204 uses two parameters to make the conversion. In particular, a line width and a bend radius are used. The line width determines the width of the waveguide, while the bend radius is a measure from the center of a bend curve to the mid-point of the waveguide. These parameters may be specified manually or may be determined automatically based on physical manufacturing limitations and the materials used. For example, a waveguide made from a given material will have a minimum practical radius, below which light will begin to escape and the signal will be degraded. Such materials and their associated minimum radii may be stored in a table and automatically implemented.

Figure 4:
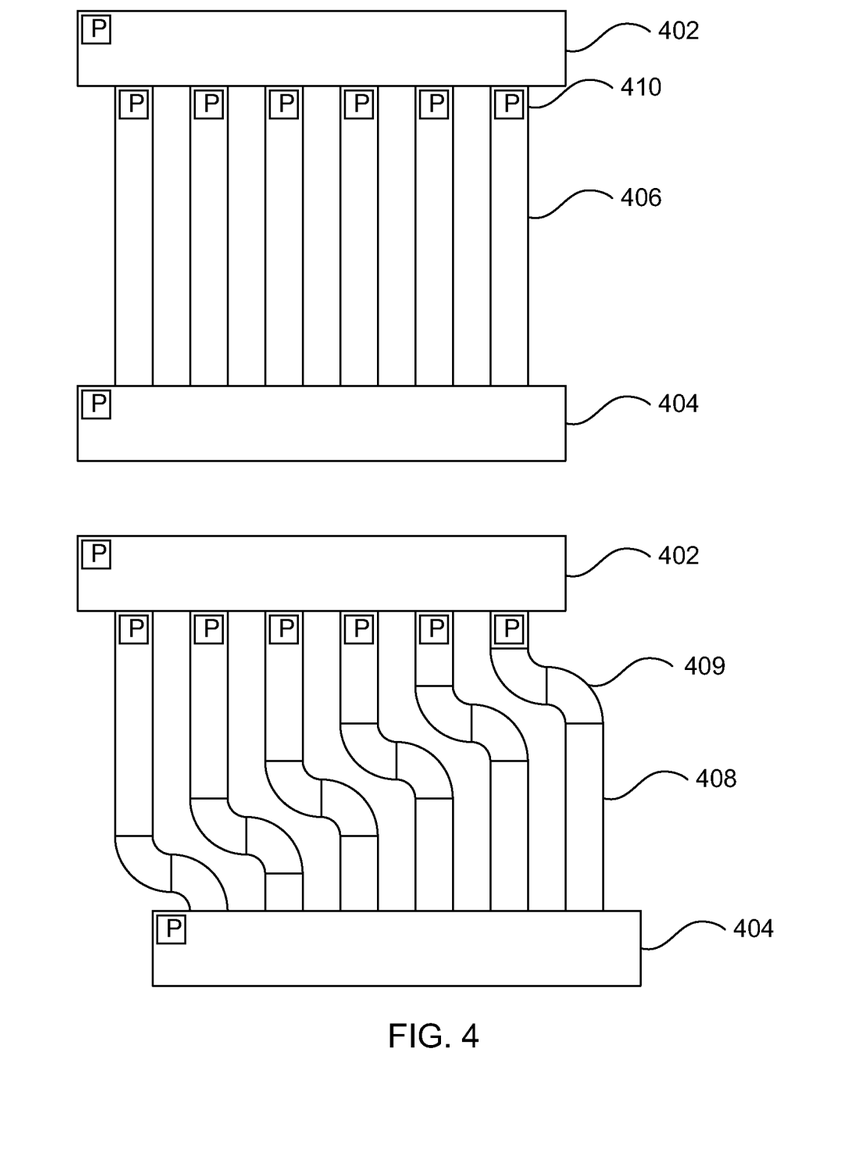
FIG. 4 is a diagram of river routing of photonic waveguides according to the present principles.

Referring now to FIG. 4, the use of radial path bending in river routing is shown. Automatic conversion to radially bent paths comes into play when performing river routing of photonic pathways. River routing allows for the rerouting of connections in a design environment when a connected element is moved. For example, if two components 402 and 404 are connected by multiple waveguides 406, river routing automatically preserves the connections between said components. If component 404 is moved laterally (e.g., to make room for another component), all of the connections between component 402 and 404 are rerouted to produce bent pathways 408. In an electronic system, river routing merely involves extending and shifting right-angled transmission lines as needed. In a photonic system, river routing preserves minimum radii in waveguide paths 408 and introduces new bends 409 as needed, so the radial bended path maker automatically provides adjustments to waveguide connections. It should be noted that the components in FIG. 4 are all photonic components, and so all include a graphical P marker 410 that distinguishes them in the design environment from electronic components.

Figure 5:
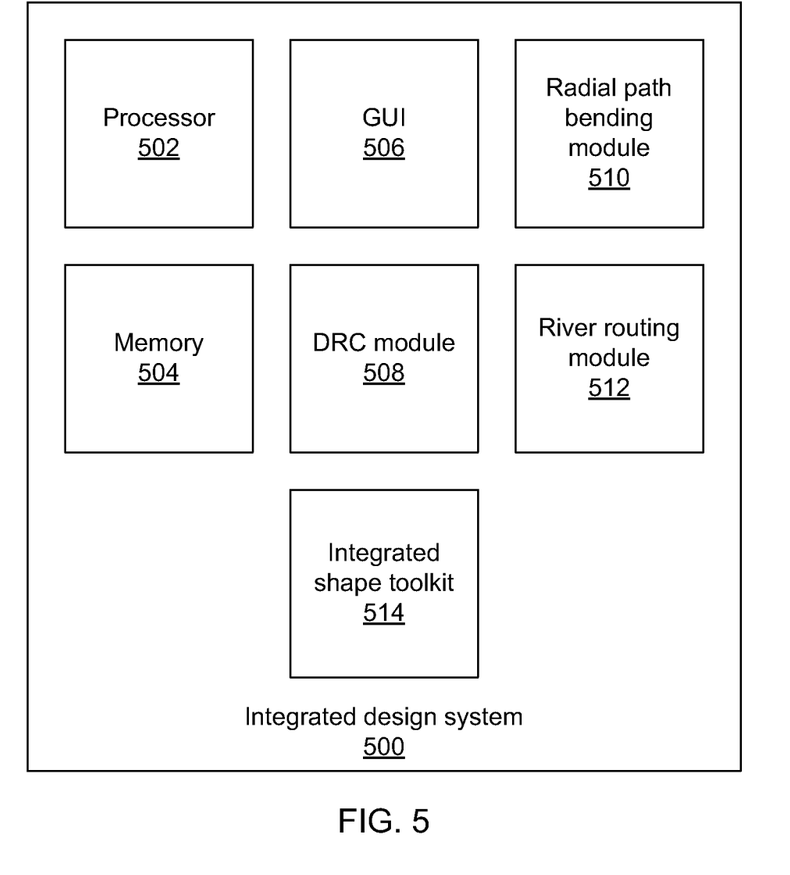
FIG. 5 is a diagram of an integrated electronic/photonic design system according to the present principles.

Referring now to FIG. 5, an integrated design system 500 is shown. The system 500 includes a processor 502, a memory 504, and a graphical user interface (GUI) 506. The GUI 506 may include a display and a user input device that allows a user to graphically design integrated electronic and photonic circuits. Toward this end, integrated shape toolkit 514 accesses a store of electronic and photonic shapes stored in memory 504 and allows a user to place such shapes within a virtual space.

Photonic components need special considerations that do not apply to electronic components. For example, a radial path bending module 510 automatically adjusts rectilinear waveguide paths in the manner described above. This allows a user to use basic tools to lay out waveguides, while the bending module 510 automatically converts the hard corners to more gentle bends. Additional tools include river routing module 512. River routing module 512 employs electronic-domain river routing techniques in combination with radial path bending module 510 to allow users to easily modify photonic design layouts, automatically preserving photonically valid connections between components.

The GUI 506 further allows a user to create, store, and modify design rules for both electronic and photonic components. Design rules are stored in memory 504 and are used by DRC module 508 to ensure that the design can be manufactured according to the specific manufacturing processes in use. For example, the DRC module 508 will check to ensure that all features meet a minimum spacing and feature size according to the physical resolution of the manufacturing technology. The DRC module 508 can also use processor 502 to automatically adjust the design to correct it in places where design rules have been violated by, e.g., enlarging or moving circuit components.

Having described preferred embodiments of a system and method for integrated design for nanophotonics (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for integrated electronic and photonic design, comprising:
   a graphical user interface (GUI) configured to lay out electronic and photonic design components in a design environment;
   a design rule checking (DRC) module configured to check design rules for electronic and photonic components according to manufacturing requirements; and
   a processor configured to adjust photonic components according to photonic design requirements, including converting corners in a piecewise linear waveguide element to radially bended curves in curvilinear photonic design elements, and to reconcile conflicts between electronic and photonic components.

2. The system of claim 1, wherein the processor is further configured to adjust photonic components by adjusting parameters of a photonic component.

3. The system of claim 1, wherein the processor is further configured to adjust photonic components by altering a shape type of the photonic component.

4. The system of claim 1, wherein the DRC module is further configured to validate every component according to a set of design rules that reflect possible manufacturing dimensions.

5. The system of claim 1, wherein the DRC module is further configured to apply a unified set of design rules for electronic and photonic components.

6. The system of claim 5, wherein the unified set of design rules includes a strictest set of rules from the union of the electronic and photonic rulesets.

7. The system of claim 1, wherein the DRC module is further configured to apply separate respective rulesets for electronic and photonic components.

8. The system of claim 1, wherein the processor is further configured to replace each corner in a piecewise linear photonic waveguide element with a corresponding radially bended curve and attach said radially bended curves with straight rectangular sections.

9. The system of claim 1, the GUI is further configured to mark photonic components with a graphical element to distinguish photonic elements from electronic elements.

10. The system of claim 1, wherein the processor is further configured to adjust component positioning and size by river routing optical connections between components to maintain optical connectivity.

11. The system of claim 10, wherein the processor is further configured to perform river routing by introducing radially bended curves in the optical connections.

12. A system for integrated electronic and photonic design, comprising:
   a graphical user interface (GUI) configured to lay out electronic and photonic design components in a design environment and to mark photonic elements with a graphical element to distinguish photonic elements from electronic elements;
   a design rule checking (DRC) module configured to check design rules for electronic and photonic components by validating every component according to a set of design rules that reflect manufacturing requirements; and
   a processor configured to adjust adjusting parameters and shapes of photonic components according to photonic design requirements, including converting corners in a piecewise linear waveguide element to radially bended curves in curvilinear photonic design elements, and to adjust component positioning and size to reconcile conflicts between electronic and photonic components.

13. The system of claim 12, wherein the DRC module is further configured to apply a unified set of design rules for electronic and photonic components.

14. The system of claim 13, wherein the unified set of design rules includes a strictest set of rules from the union of the electronic and photonic rulesets.

15. The system of claim 12, wherein the DRC module is further configured to apply separate respective rulesets for electronic and photonic components.

16. The system of claim 12, wherein the processor is further configured to replace each corner in a piecewise linear photonic waveguide element with a corresponding radially bended curve and attach said radially bended curves with straight rectangular sections.

17. The system of claim 12, wherein the processor is further configured to adjust component positioning and size by river routing optical connections between components to maintain optical connectivity.

18. The system of claim 17, wherein the processor is further configured to perform river routing by introducing radially bended curves in the optical connections.

19. A system for integrated electronic and photonic design, comprising:
   a graphical user interface (GUI) configured to lay out electronic and photonic design components in a design environment and to mark photonic elements with a graphical element to distinguish photonic elements from electronic elements;
   a design rule checking (DRC) module configured to check design rules for electronic and photonic components by validating every component according to a unified set of electronic and photonic design rules that reflect manufacturing requirements; and
   a processor configured to adjust adjusting parameters and shapes of photonic components according to photonic design requirements, including converting corners in a piecewise linear waveguide element to radially bended curves in curvilinear photonic design elements by replacing each corner in a piecewise linear photonic waveguide element with a corresponding radially bended curve, and to adjust component positioning and size to reconcile conflicts between electronic and photonic components, river routing optical connections between components to maintain optical connectivity.

* * * * *